June 30, 1953  J. B. FURR ET AL  2,644,016
CHLORINATION OF ETHANE
Filed Nov. 12, 1949
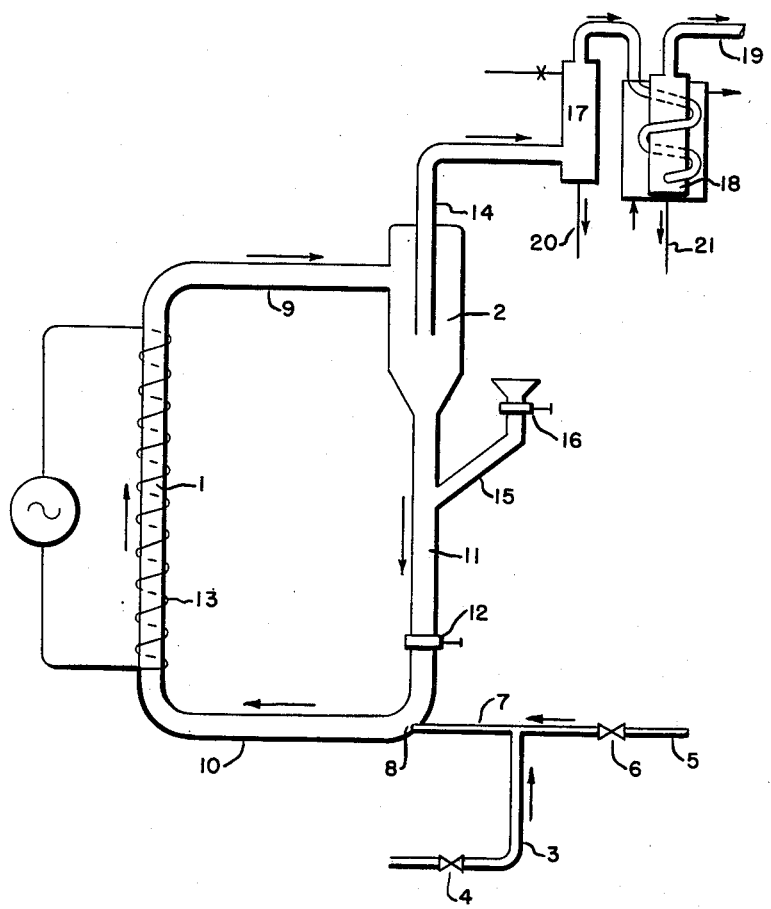
INVENTORS
JOHN B. FURR
CLARENCE M. NEHER
BY
Kenneth Swartwood Patented June 30, 1953

2,644,016

UNITED STATES PATENT OFFICE 2,644,016

CHLORINATION OF ETHANE

John B. Furr and Clarence M. Neher, Baton Rouge, La., assignors to Ethyl Corporation, New York, N. Y., a corporation of Delaware Application November 12, 1949, Serial No. 126,768

5 Claims. (Cl. 260—662)

This invention relates to the chlorination of hydrocarbons. More particularly, the invention relates to a new and improved process for manufacture of ethyl chloride and other valuable chloroethanes by the chlorination of ethane.

It is known that the chlorides of ethane can be formed by the direct reaction of chlorine and ethane. This direct chlorination reaction has often been proposed for the manufacture of the commercially valuable chloroethanes, especially ethyl chloride. Methods for carrying out substitution chlorination reactions usually involve initiating and maintaining the reaction thermally (by elevated temperature) or by the action of actinic light. However, attempts to utilize substitution chlorination reactions have not been fully successful because of various practical deficiencies.

The thermally initiated reaction requires special provisions to prevent the reaction occurring with explosive violence. For example, Lacy in U. S. Patent 1,242,208 has proposed the use of a large excess of ethane, the feed materials being in the volume ratio of 1:8 chlorine:ethane. While successful in controlling and moderating the reaction, the use of such a large excess imposes an economic burden on the overall process, as, in the recovery of the ethyl chloride, all the excess unreacted gas must be cooled to a low temperature in the condensation and liquefaction of the ethyl chloride.

In an attempt to overcome the disadvantages of a thermal reaction, it has been proposed, in British Patent 513,947 to carry out the thermal chlorination, in the presence of a bed of fluidized finely divided solids catalyst. The movement of the reacting gases is utilized to suspend the catalyst particles uniformly in the reaction space, in the manner of a boiling liquid. We have tested the method disclosed in this patent, but the process has not been fully satisfactory.

The use of actinic light for photochemically initiating the chlorination reaction has been widely studied, and numerous reaction techniques have been suggested. All of these photochemical methods, however, are particularly susceptible to the poisoning or inhibition action of certain impurities commonly found in the feed gases. In particular, oxygen and nitrogen oxides are strong poisons for the photochemical reaction. The feed streams for a photochemical process must therefore be especially purified before they can be utilized in a photochemical process.

It is an object of our invention to convert a high percentage of ethane to ethyl chloride by a direct chlorination reaction, thereby avoiding the necessity of recycling large quantities of unreacted ethane. A further object is to provide a chlorination process which does not require special treatment of the feed gases to remove trace impurities which act as poisons for photochemical reactions. An additional object is to provide a process resulting in a higher conversion of the ethane to ethyl chloride than can be realized in a conventional fluidized catalyst reaction.

We accomplish our objects by thermally reacting a gaseous mixture of ethane and chlorine, in the presence of a fully suspended, finely divided graphite catalyst. The process is carried out by combining gaseous chlorine and ethane, introducing catalyst to the mixture and thereafter thermally reacting while maintaining the catalyst fully suspended in the reacting gases. By fully suspending, we mean that all the particles of catalyst are uniformly transported with the reacting gases, instead of being merely agitated in the manner of the fluidized catalysts frequently employed in petroleum cracking operations. The condition of fully suspended catalyst is characterized by a low weight concentration of the catalyst solids, as contrasted to the catalyst density obtained by merely fluidizing in the conventional manner. The catalyst concentration according to our process is only, for example, from one-fifth to one-third the density encountered in a conventional fluidized catalyst operation using the same catalyst. The fully suspended condition is attained by maintaining the reacting gases at a sufficiently high velocity to freely transport all the catalyst particles, in contrast to merely agitation thereof, as in fluidized catalysts. Our invention resides in the discovery that thermally reacting in the presence of a fully suspended graphite catalyst provides improved yields as well as the other objects of the invention.

The accompanying figure shows apparatus suitable for carrying out our process, a specific embodiment being described below for a full understanding of the manner of operation.

Referring to the figure, the apparatus comprises essentially a tubular reaction chamber 1 and a catalyst disengaging space or section 2, the two sections being connected at top and bottom by horizontal connecting tubes 9 and 10. Numeral 3 denotes a chlorine feed line, the flow being controlled by valve 4. Ethane feed is by line 5, the flow rate being controlled by valve 6. Chlorine and ethane feeds are joined and mixed in line 7 which terminates in a feed nozzle 8. The feed nozzle 8 is positioned at the inlet to the horizontal line 10. A drop leg 11 also connects with line 10, and provides a feed of catalyst separated by separator 12 from the products.

In operation, the mixture of chlorine and ethane pick up catalyst by reason of their jet action. The flow of catalyst particles is controlled by regulation of a slide valve 12 in the drop leg 11.

The mixture of feed gases and catalyst is passed by line 10 to a vertical reaction zone 1. Heat is supplied to this zone when required by an electric heating coil 13. The reacting mixture flows upwardly in the reacting zone, the catalyst being maintained in the fully suspended condition. The reacted gaseous products flow through line 9 to the catalyst separator 2. Separation is here effected by centrifugal action, the catalyst being collected in a drop leg 11. The reacted gases, free of catalyst particles, are discharged from the separatory chamber 2 through line 14 and flow to purification and recovery equipment.

The purification and recovery equipment includes a water scrubber 17 and a condenser 18. Hydrogen chloride, formed by the substitution chlorination reaction, is absorbed in water in scrubber 17, the resulting hydrochloric acid being discharged through line 20. The chlorinated hydrocarbon products are condensed in refrigerated condenser 18 and discharged through line 21. Unreacted ethane and by-product hydrocarbon gases are discharged through line 19.

The following illustrates by specific example a typical embodiment of the process using the apparatus described above. The reactor was charged with powdered flake graphite through charge line 15 and valve 16. The catalyst varied in size from 50 to 250 microns, the particles averaging 165 microns in diameter.

The reactor section was heated, by electric current applied to coil 13, to a temperature of approximately 400° C. Operation was then started by feeding chlorine and ethane through lines 3 and 5 respectively. The chlorine was fed at the rate of 1050 grams per hour and the ethane at the rate of 440 grams per hour.

The flow of feed gases and catalysts was such that the density of catalyst in the reaction zone was 4.7 pounds per cubic foot, the superficial gaseous velocity in this zone being 7.6 feet per second. The residence time of the reacting gases in the reaction zone was only 0.19 second, but the chlorine was completely reacted.

The hydrogen chloride absorbed by water in the scrubber amounted to 643 grams. In the same period, 690 grams of chlorinated hydrocarbons were recovered, consisting of the following chloroethane derivatives:

| | Weight percent |
|---|---|
| Vinyl chloride | 4.0 |
| Ethyl chloride | 60.2 |
| 1,1-dichloroethane | 29.2 |
| 1,2-dichloroethane | 6.4 |
| 1,1,2-trichloroethane | 0.2 |

In this particular run, 44 percent of the ethane fed was converted to ethyl chloride. The total quantity of ethane reacted was 81.2 percent of the ethane fed.

The embodiment described above should be considered primarily illustrative, as the conditions of operation can be substantially varied without departing from this invention. To illustrate the range of adaptability of the process, the effect of varying chlorine:ethane volume or mole ratio is given in the table following.

*Effect of chlorine : ethane ratio*

[Catalyst concentration in reaction zone : 4.7 pounds per cu. ft. Reaction temperature 400–450° C.]

| Run | Feed ratio by volume $Cl_2:C_2H_6$ | Superficial gas velocity ft. per sec. | Conversion of ethane to ethyl chloride, percent |
|---|---|---|---|
| 1 | 0.15 | 6.1 | 13.4 |
| 2 | 0.4 | 7.4 | 34.1 |
| 3 | 0.7 | 6.9 | 44.0 |
| 4 | 1.0 | 7.6 | 44.0 |
| 5 | 1.3 | 7.4 | 33.0 |
| 6 | 1.7 | 7.4 | 6.2 |

In all the runs summarized above, the reaction proceeded smoothly and the chlorine was substantially completely reacted. It will be noted that the ratio of chlorine:ethane was varied over ten fold, illustrating the flexibility of the process for varying chlorine concentrations in the mixed feed.

As would be expected, the proportion of ethane converted to ethyl chloride varies with a variation in chlorine to ethane ratio, the highest yield of ethyl chloride, on the basis of ethane fed, being at a chlorine:ethane feed ratio of 0.7:1.0 to 1.0:1.0. If the desired products are the higher chlorides of ethane, the chlorine:ethane ratio can be increased to 1.7:1.0 or even above, with a corresponding increase in the more highly chlorinated ethane derivatives in the product.

As a matter of practical importance in the chlorination of ethane to give ethyl chloride, a chlorine:ethane ratio of approximately 1.0:1.0 would almost invariably be used, because the conversion of each component to ethyl chloride would be the same. Any improvement in the conversion of ethane to ethyl chloride, at this feed ratio would be accompanied by a corresponding increase in the utilization of chlorine. Although the feed ratio is not critical to the objects of our process, we have made the surprising finding that the yield of ethyl chloride is increased in the range of feed ratios which would preferably be used for the reasons stated above. This advantage is illustrated by contrast with results obtained by our process as contrasted to the yields from a conventional fluidized catalyst process. For example, we have carried out a conventional fluidized catalyst chlorination using the same powdered graphite catalyst as used in our process. With this conventional fluidized catalyst operation, a relatively low gas velocity is used and the catalyst is maintained at a high weight concentration in the reaction zone. In a typical chlorination, with a chlorine:ethane feed ratio of 1.0:1.0, the superficial gas velocity in the reaction zone was 0.7 foot per second, and the catalyst density was maintained at the high density level of 22 pounds per cubic foot. In this run, 40 percent of the ethane was converted to ethyl chloride. In contrast, as shown by the preceding table, at the same chlorine:ethane ratio, the yield of ethyl chloride is 44 percent. In short, by utilizing the present process, approximately one-tenth more ethyl chloride can be produced from a given amount of chlorine and ethane feeds over that obtainable by the fluidized catalyst process. This yield advantage is exhibited throughout the range of chlorine:ethane feeds of 0.4:1.0 to 1.3:1.0. With feed ratios below or above this range, the ethyl chloride yield advantage no longer exists—in fact, the ethyl chloride yields will be somewhat below those obtained by the conventional fluidized catalyst type of operation. Therefore, though our process is not limited in operability, a preferred range of feed ratios, particularly for ethyl chloride production, is the chlorine:ethane volume ratio of from 0.4:1.0 to 1.3:1.0.

The process is carried out at an elevated temperature which results in a rapid and high degree of reaction even in an extremely brief reaction time. We have found that a temperature of 400° C. or above is highly desirable for a satisfactory rate of reaction. Temperatures even above 500° C. do not greatly affect the yield of ethyl chloride. However, it has been found that a temperature above 500° C. should be avoided because it results in appreciable decomposition of some of the valuable by-products of the reaction. The preferred range of operating temperature is thus 400°–500° C. It is to be noted that this temperature is well above the temperature at which ethyl chloride will ordinarily almost completely decompose. We avoid this decomposition tendency to a great extent by utilizing a very limited reaction time of the order of one to two seconds and thereafter allowing the products to cool. It has been found that the elevated temperature range preferred can be utilized if the reacting materials and the products are exposed to the elevated temperatures for only a brief period and are subsequently cooled.

As heretofore stated, the catalyst used in our process is powdered graphite. The preferred particle size is an average size of 165 microns, but the graphite is not limited to this size. We have found that the graphite can range from 50 to about 250 microns average size and that excellent results will be obtained throughout this range. Sizes much smaller than 50 microns should be avoided, as extremely small particles will tend to pack or plug in certain portions of the process equipment.

Catalyst can be introduced or mixed with the reacting gases by any convenient manner. The preferred method involves allowing the catalyst to drop by gravity in the path of a feed jet of the fresh chlorine and ethane. A suitable velocity of such a feed jet is of the order of 10 to 20 feet per second. This feed gas velocity is substantially greater than the superficial velocity of the reacting gases in the reaction zone, but is desirable for providing rapid and uniform dispersion of the catalyst particles in the feed gases. The actual rate of catalyst circulation is preferably regulated by means of slide valves in the "stand-pipe" or catalyst supply vessels.

The velocity of the reactants in the reaction zone is not critical, but should be adequate to support or flow the catalyst in the required fully suspended condition. The precise velocity needed will vary, depending upon the particle size catalyst employed. For the preferred range of catalyst sizes, the gas velocity can be varied within the range of 4 to 10 feet per second, the lower velocities being suitable for finer sizes of catalyst. The catalyst density, in the fully suspended condition is from 1 to 6 pounds per cubic foot, higher densities merging into the conventional fluidized catalyst condition.

The reaction time required for the process is surprisingly low. We have found that substantially all the chlorine fed to a reactor is reacted with a reaction time of 0.1 second or over. The preferred range of reaction times is from 0.2 to to 0.6 seconds. The shorter contact periods are preferably employed at more elevated temperatures As already mentioned, an object of our process is to avoid the inhibiting effect of impurities commonly found in both hydrocarbon and chlorine gases. We have ascertained that the use of commercial streams normally containing these inhibiting impurities is perfectly satisfactory in our process. Thus, a commercial waste ethane stream, which normally contains from 0.01 to 0.20 volume percent oxygen impurity, has been used at length as a feed to our process. This commercial stream was utilized without detectable difference from the performance with a reagent grade ethane feed. Similarly, a commercial chlorine stream, obtained by the electrolysis of fused salts has been found entirely satisfactory. This type of feed is highly unsuitable for photochemical chlorination unless it is specially treated to remove impurities, such as nitrosyl chloride and nitric oxide. Such special purification treatment is rendered unnecessary by our process.

Heat input to the reacting materials is not always required in normal operations. Under some circumstances it will be found that the heat released by the reaction itself is sufficient to heat incoming gases to the reaction temperature. Under most conditions, however, and particularly during starting up operations, an input of heat will be required.

It will be apparent that numerous modifications of the process are possible within the scope of the following claims.

We claim:

1. A process of chlorinating ethane, which comprises forming a mixture of from 0.4 to 1.3 parts by volume of chlorine, 1 part by volume of ethane and a concentration therein of from 1 to 6 pounds per cubic foot of fully suspended graphite powder having a particle size of from 50 to 250 microns, and passing said mixture through a reaction zone at a temperature of from 400 to 500° C. and with a gas velocity of from 4 to 10 feet per second.

2. A process as claimed in claim 1, wherein the gas mixture with fully suspended graphite particles therein passes through the reaction zone within a period of from 0.2 to 0.6 seconds.

3. A process as claimed in claim 1, wherein the gas mixture is composed of from 0.7 to 1 part by volume of chlorine and 1 part by volume of ethane.

4. A process as claimed in claim 1, wherein the graphite particles are fully suspended in the mixture of chlorine and ethane by introducing them into such mixture while it is travelling at a velocity of from 10 to 20 feet per second, and then reducing the velocity of the resultant suspension to from 4 to 10 feet per second before passing it through the reaction zone.

5. A process as claimed in claim 4, wherein the reaction mixture is passed upwardly through the reaction zone, the graphite particles are separated from the reacted mixture and recycled by introducing them into the gas mixture.

JOHN B. FURR.
CLARENCE M. NEHER.

References Cited in the file of this patent

UNITED STATES PATENTS

| Number | Name | Date |
|---|---|---|
| 1,799,858 | Miller | Apr. 7, 1931 |
| 1,984,380 | Odell | Dec. 18, 1934 |
| 2,162,532 | Flemming et al. | June 13, 1939 |
| 2,231,424 | Huppke | Feb. 11, 1941 |
| 2,464,505 | Hemminger | Mar. 15, 1949 |

FOREIGN PATENTS

| Number | Country | Date |
|---|---|---|
| 513,947 | Great Britain | Oct. 26, 1939 |